Dec. 3, 1957 D. A. BRUGLER 2,814,841
SEALING STRIP
Filed Oct. 19, 1955
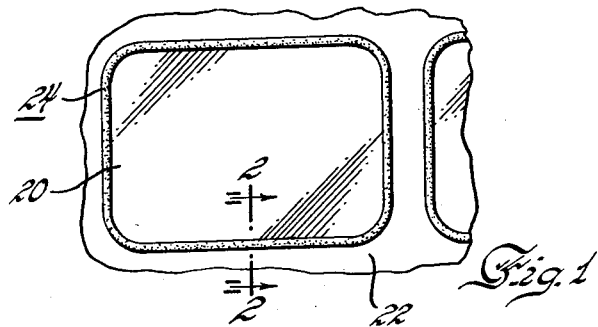
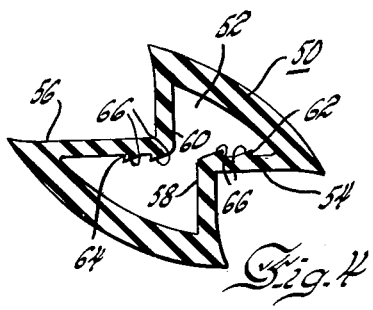
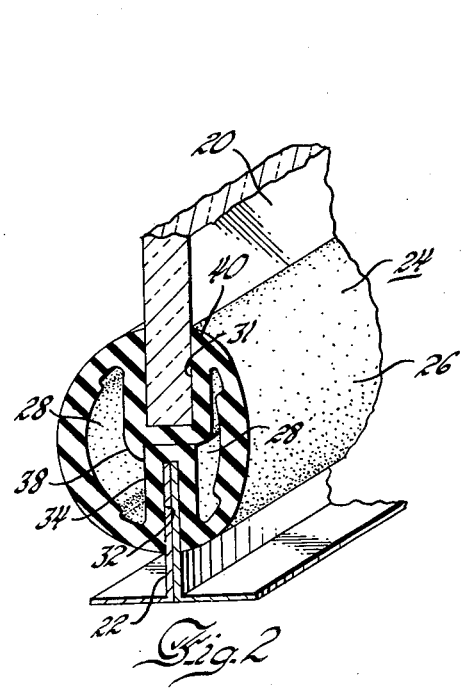
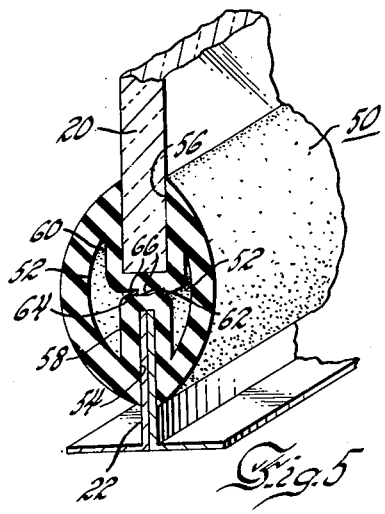
INVENTOR.
Dale A. Brugler
BY John T. Marvin
HIS ATTORNEY ated Dec. 3, 1957

United States Patent Office 2,814,841

2,814,841

SEALING STRIP

Dale A. Brugler, Dayton, Ohio, assignor to General Motors Corporation, Detroit, Mich., a corporation of Delaware Application October 19, 1955, Serial No. 541,486

4 Claims. (Cl. 20—56.4)

This invention relates to sealing strips and is particularly concerned with self-sealing strips formed from elastomeric material and adapted to engage edge portions of parts to be joined.

It is an object of the invention to provide a cushion-like sealing strip which is readily engaged upon edge portions of parts to be joined and which by transverse pressure applied thereto may be interlocked so as to sealingly engage said edge portions of the parts.

It is a further object of the invention to provide a resilient sealing strip which includes a longitudinally extending chamber therein together with a pair of opposed grooves opening at the outer surface of the strip. Longitudinally extending interlocks are provided at the internal surfaces of said grooves whereby edges of parts to be joined may be inserted in the grooves and by transverse pressure applied thereto cause the interlock portions to move into engagement with one another whereby the strip and parts are assembled in sealed relation.

A still further object of the invention is to provide abutment areas for the interlock which are adjustable transversely thereof so that parts having different thicknesses may be joined and sealed through the use of a single strip which is adjustable with respect to the width of parts which may be received therein.

Further objects and advantages of the present invention will be apparent from the following description, reference being had to the accompanying drawings, wherein a preferred form of the invention is clearly shown.

In the drawings:

Figure 1 is a fragmentary plan view of a window joined to a body panel by means of a sealing strip of the character described;

Figure 2 is a fragmentary section taken on line 2—2 of Figure 1;

Figure 3 is a sectional view of one type of sealing strip as shown in Figure 2 in the free state;

Figure 4 is another embodiment of the invention showing a cross section of the sealing strip in the free state; and Figure 5 is a fragmentary sectional view similar to the view shown in Figure 2 wherein the sealing strip of Figure 4 is used as a joining means.

Resilient sealing strips are widely used as a means for joining panels and the like. These strips are used in building structures and are more widely used in automotive applications wherein one of the panels is a glass pane and the other of the panels is a portion of the body. For example, windshields and rear windows are installed in automotive bodies through the use of sealing strips of the character described in this application.

These strips are necessarily made of a rubber-like material such as rubber, butadiene styrene copolymers, butadiene acrylonitrile copolymers, polychloroprene and plastic materials such as vinyls and the like wherein the rubberlike material is compounded if desired to provide an elastomeric material which weathers well and does not harden or crack in the sun to any great extent. These rubberlike sealing strips take many forms and generally include two opposed grooves of different widths, one of which is adapted to pass over, grip and seal a pinch weld, for example, of a body, while the other is adapted to receive and sealingly engage a glass pane such as the windshield, rear window, etc. The said grooves are normally slightly less in width than the panel member to be received therein so that a good sealing engagement is provided. Strips of the Eichner type, as shown in Patent No. 2,189,138, are also extensively used wherein a filler or wedge strip is provided which makes the sealing strip more flexible in that variations in the thickness of the panels to be joined are not as critical since the filler or wedge strip provides sealing forces that adjust for variations in thickness of the panels.

In some applications of sealing strips it is desirable to have the strip of a cushioning nature so as to more completely absorb road shocks and the like and still provide an adequate seal between portions of panels to be joined. The present invention is directed to such a strip wherein the strip is of a cushion-like nature, fabricated from extruded stock in long lengths and wherein the strip is easy to install and adjustable in its action with respect to the width of panels to be joined thereby.

Referring specifically to the drawings a portion of a window such as is used in a bus is shown in Figure 1 at 20. The window or pane 20 fits within an opening in the body 22 and is sealed and assembled thereto through the use of a sealing strip 24 which extends around the entire periphery of the window. A fragmentary section of this structure is shown in Figure 2 wherein the pane is shown at 20, the pinch weld of the body at 22 and the sealing strip at 24. The strip 24 in unassembled form is shown in cross section in Figure 3 and includes a body portion 26 which is hollow or tubular in form as determined by a chamber 28 which extends throughout the length thereof. It is apparent in this instance that the sealing strip 24 is elongate in nature and of indeterminate length. An open groove 31 is provided at one side of the body portion 26 and a second groove 32 is provided in generally opposed relation thereto. The groove 32 is formed by a channel 34 which extends inwardly into chamber 28. The groove 31 is formed by a generally channel-shaped portion 36 which extends inwardly of the chamber 28. Extending longitudinally at the internal surface of the channel 36 is an interlock or abutment 38.

Again referring to Figure 2 it will be seen that when the sealing strip is to be installed, the groove 32 is placed over the pinch weld portion of the body and pane 20 is set in the groove 31. Transverse pressure applied thereto causes the upper portion of the strip to move toward the left which closes the groove 31 due to the fact that the lip 40 moves upwardly into engagement with the pane 20. At this time the abutment 38 passes over the edge of channel 34 and interlocks therewith preventing disassembly of the parts. It can be seen in this instance that the chamber 28 has now been divided into two chambers and that the sealing strip will sealingly engage the edges of both panels to be joined namely the pane 20 and the pinch weld 22.

Another embodiment of the invention is shown in Figure 4. In this instance a body portion 50 is provided which includes a longitudinally extending internal chamber 52 therein. A pair of opposed grooves 54 and 56 are formed in the body 50 by means of channel portions 58 and 60 respectively which extend into the chamber 52. Abutment areas 62 and 64 are formed on the internal surfaces of the channels 58 and 60 and comprise a plurality of longitudinally extending transversely spaced ribs or barbs 66.

In assembly of this strip the pinch weld 22 is set against one face of the groove 54 while the pane 20 is set against the opposite face of the groove 56. The transverse pressure applied in opposite directions and toward the center causes the hollow sealing strip 50 to deform whereupon the barbs 66 longitudinally engage each other at the interlocking abutment areas to maintain the position of the strip with respect to the panels to be joined. In this case, however, due to the fact that there are a plurality of transversely spaced longitudinally extending interlocking barbs, it is possible by transverse pressure to adjust the sealing engagement of the strip with respect to the panels whereby it is possible to compensate for variations in width of said panels. At this instance, also, the single chamber 52 after assembly of the strip to the panels has become two separate chambers.

The sealing strip disclosed herein is easily assembled and may be inexpensively fabricated from extruded rubber-like stock. The strip due to its tubular nature is cushion-like so as to form a shock absorbing joining means of considerable flexibility. In some applications the strip may be cut to length and mitered at the corner portions to affect a suitable assembly.

While the forms of embodiment of the invention as herein disclosed constitute preferred forms, it is to be understood that other forms might be adopted, as may come within the scope of the claims which follow.

What is claimed is as follows:

1. A sealing strip adapted to engage and hold edge portions of parts to be joined in substantially sealed relation to one another, comprising, a longitudinally extending tubular body of resilient material having spaced apart longitudinally extending abutments within the hollow interior thereof, said tubular body being adapted after assembly upon edges of parts joined to be deformed for forming spaced longitudinally inwardly extending grooves therealong for holding said edges, said normally spaced apart abutments in the deformed position being longitudinally interlocked within said tubular body for maintaining the strip in assembled and sealed relation with respect to the parts to be joined.

2. A sealing strip adapted to engage and hold edge portions of parts to be joined in substantially sealed relation to one another, comprising, a tubular longitudinally extending body portion formed from resilient material, a single groove formed by a longitudinally extending channel which extends into the hollow interior of the tubular body portion, a second normally open groove extending longitudinally of the body portion in opposed relation to said first mentioned groove, and a longitudinally extending abutment interiorly arranged with respect to said second mentioned groove whereby a part positioned in said second mentioned groove may be assembled therein by transverse pressure applied to close the second mentioned groove for sealingly engaging the part and for simultaneously interlocking said abutment over a portion of said channel within said tubular body for maintaining said several parts in assembled relation.

3. A cushion-like resilient sealing strip adapted to engage and hold edge portions of parts to be joined in substantially sealed relation to one another, comprising, an elongated hollow body of resilient material including a single internal chamber extending throughout its length, a pair of longitudinally extending grooves opening along the outer surface of said body and arranged in opposed relation to one another and formed by channel portions which extend into said chamber, a pair of normally spaced longitudinally extending abutments wholly within said chamber one of which is associated with an internal portion of one of said grooves and the other of which is associated with an internal portion of the other of said grooves, whereby said abutments are adapted to be longitudinally interlocked with one another for dividing said single internal chamber into two separate chambers and for causing said grooves to longitudinally engage and seal edge portions of parts positioned therein.

4. A cushion-like resilient sealing strip adapted to engage and hold edge portions of parts to be joined in substantially sealed relation to one another, comprising, an elongated hollow body of resilient material including a single internal chamber extending throughout its length, a pair of longitudinally extending grooves opening along the outer surface of said body and arranged in opposed relation to one another and formed by channel portions which extend into said chamber, a pair of normally spaced longitudinally extending abutment areas wholly contained within said chamber each including a plurality of transversely spaced interlocks extending longitudinally thereof, one of said areas being associated with an internal portion of one of said grooves and the other of said areas being associated with an internal portion of the other of said grooves whereby said abutment areas are adapted to be engaged and adjustably interlocked by transverse pressure applied thereto for adjustably gripping edge portions of parts inserted within said grooves.

References Cited in the file of this patent

FOREIGN PATENTS 916,501 Germany _____ Aug. 12, 1954